United States Patent [19]

Humphreys

[11] 4,423,444

[45] Dec. 27, 1983

[54] METHOD FOR RECORDING A MAGNETIC AUDIO TAPE AND APPARATUS FOR GENERATING A TELEVISION SIGNAL FROM THE RECORDED MAGNETIC AUDIO TAPE

[76] Inventor: John L. Humphreys, 12048 Greywing Sq., Reston, Va. 22091

[21] Appl. No.: 279,190

[22] Filed: Jun. 30, 1981

[51] Int. Cl.³ ............................................. G11B 31/00
[52] U.S. Cl. .................................................... 360/79
[58] Field of Search ....................... 360/79, 39, 32, 37, 360/27, 14, 22; 369/93, 296; 340/794, 745, 324

[56] References Cited

U.S. PATENT DOCUMENTS

| | | | |
|---|---|---|---|
| Re. 30,482 | 1/1981 | Whitlock | 360/32 |
| 3,865,973 | 2/1975 | Masuda et al. | 358/5.8 R |
| 3,881,390 | 5/1975 | Gullickson | 360/79 X |
| 3,891,792 | 6/1975 | Kimura | 358/5.8 R |
| 3,898,376 | 8/1975 | Nabeyama et al. | 358/5.8 R |
| 3,921,161 | 11/1975 | Baer | 360/79 X |
| 3,956,579 | 5/1976 | Doumit | 358/6 |
| 4,072,989 | 2/1978 | Grant | 360/80 |
| 4,121,264 | 10/1978 | Kishi et al. | 360/27 X |
| 4,194,198 | 3/1980 | Baer et al. | 340/724 |
| 4,204,208 | 5/1980 | McCarthy | 340/745 |
| 4,295,154 | 10/1981 | Hata et al. | 360/32 X |

Primary Examiner—Alfred H. Eddleman
Assistant Examiner—K. Wong

Attorney, Agent, or Firm—Sherman & Shalloway

[57] ABSTRACT

An apparatus is disclosed for generating a television signal including a discrete electronic audio signal in synchronization with a discrete electronic video signal. A magnetic audio tape having a first track of digital information and a second track of audio information, the tracks being in synchronization, is played on an audio tape deck. The first track of digital information is converted into a corresponding digital electronic signal and the second track of information is simultaneously converted into the discrete electronic audio output of the television signal. A video character generator receives at its input the digital electronic signal from the first track and converts the digital electronic signal into the discrete video signal of the television signal. A frequency shift keying line amplifier is connected between the audio tape deck and the input of the video character generator for amplification of the frequency of the digital electronic signal into a range which is compatible with the video character generator. A sync-color generator may be connected to the video character generator for controlling the color of a corresponding video output of the discrete video signal. Various monitoring means are disclosed which monitor the interrelated components.

Also disclosed is a method of generating a television signal and a method of prerecording a multichannel magnetic tape for use in the system.

9 Claims, 1 Drawing Figure

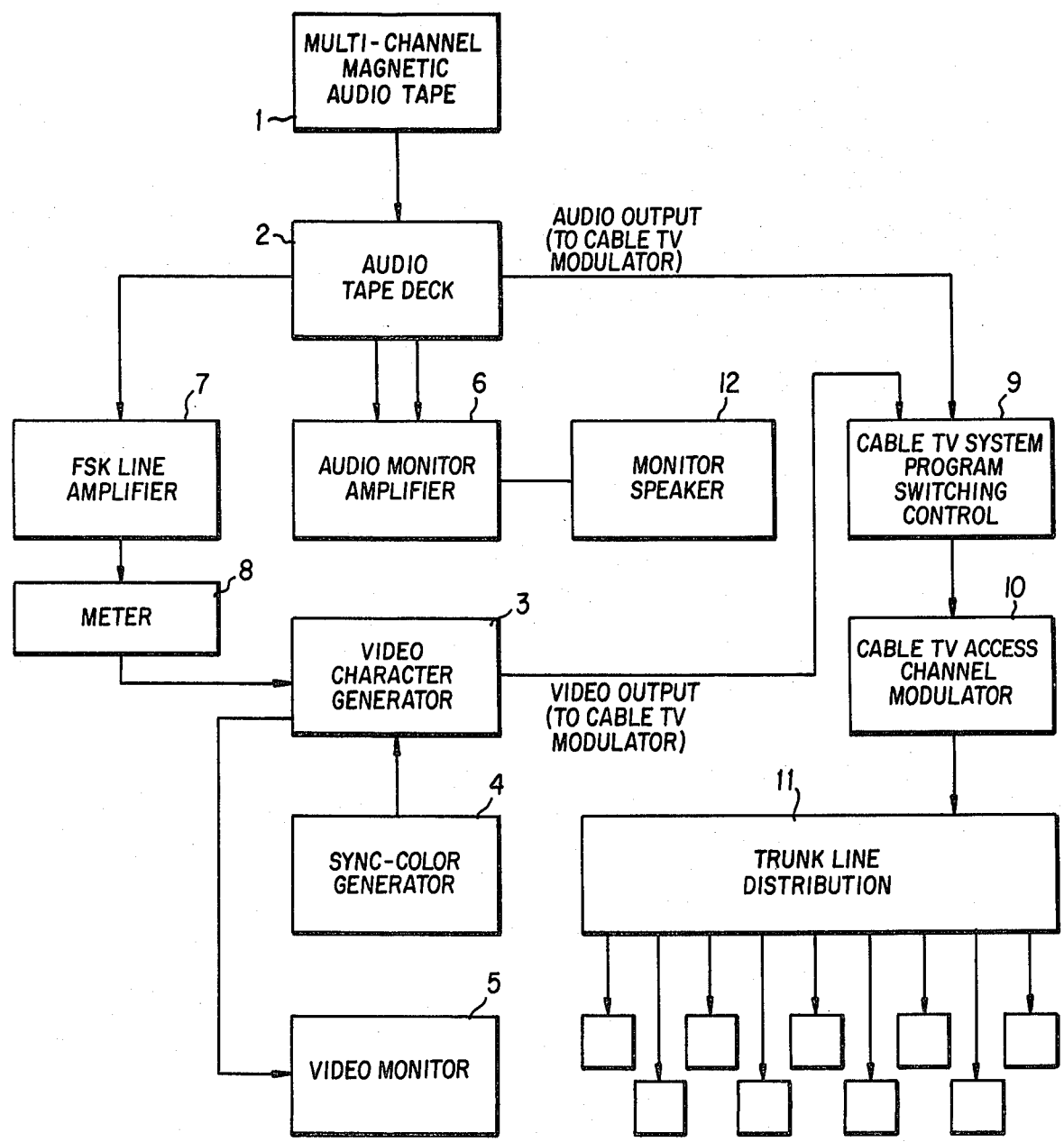

METHOD FOR RECORDING A MAGNETIC AUDIO TAPE AND APPARATUS FOR GENERATING A TELEVISION SIGNAL FROM THE RECORDED MAGNETIC AUDIO TAPE

BACKGROUND OF THE INVENTION

1. Field of the Invention

The invention relates to captioned radio which is a simple technique employing an audio program and character generator, operating in a synchronous and organized manner for television viewership, especially for distribution on cable TV systems. In particular, the invention relates to the reversal of the delivery priority of television presentation. According to the captioned radio invention, the audio bears more importance on the communication than does the video. In effect, the invention allows a television receiver to act as a radio with associated printed data displayed on the TV screen. The invention also relates to a process for creating a program on a magnetic audio tape having first and second channels wherein the program is comprised of an audio message captioned with a video message of character generator signals.

2. Description of the Prior Art

U.S. Pat. No. 3,865,973, issued to Masuda, et al.; and U.S. Pat. No. 3,898,376, issued to Nabeyama, et al., disclose the concept of a receiver for receiving a composite signal which consists of a multiplex video and audio signal. These patents disclose that the audio and visual signals are necessarily synchronized in order for the presentation of the receiver but require a much more complex system and are not specifically directed to displaying still characters on a television screen with the audio broadcast being the main component.

U.S. Pat. No. 3,891,792, issued to Kimura, is directed to the concept of displaying multiple images on a television display tube wherein one of the images comprises alpha-numeric characters which are superimposed upon the moving display. There is no coordination in the Kimura patent between the audio broadcast and the alpha-numeric display.

The system in U.S. Pat. No. 3,956,579, issued to Doumit, employs scheduled information which is alpha-numeric in character and displayed in conjunction with video and audio messages. However, in this system, the audio and still video signals are not broadcast from a magnetic tape. Rather, the still image is delivered from focusing a television camera on a slide and simply broadcasting the output from the camera in a conventional fashion. This requires extremely expensive and sophisticated equipment.

Generally, the prior art fails to disclose the use of a magnetic audio tape having a plurality of channels which synchronously carry an audio message and a video message of character generator signals. In addition, the prior art fails to disclose an apparatus for employing such a tape wherein an audio tape deck is employed to convert the audio message into an audio channel and to convert the video message of character generator signals into a signal for driving a video character generator to display the video signals on a cathode ray tube.

SUMMARY OF THE INVENTION

It is an object of this invention to disclose a captioned radio system which may be employed in combination with cable TV to generate a television signal including a primary audio signal in synchronization with an alpha-numeric video signal.

It is a further object of this invention to provide an apparatus for generating a television signal from a magnetic audio tape.

It is a further object of this invention to provide a television signal on audio tape which may be inexpensively and efficiently duplicated at high speeds.

It is another object of this invention to provide an apparatus for generating a television signal by employing a magnetic audio tape which is automatic by reason of the use of priority reversal.

It is another object of this invention to provide an audio magnetic tape having a first track of audio in synchronization with a second track of digital information for use with a character generator to provide a synchronized program for publication.

It is a further object of this invention to provide a magnetic audio tape having first and second channels, the first channel carrying an audio message and the second channel carrying a video message of character generator signals in synchronization with the audio message.

It is another object of this invention to describe a process for captioning an audio message with a video message of character generator signals onto a magnetic audio tape having first and second channels.

A multi-channel magnetic audio tape has a plurality of tracks with a first track of digital information and a second track of audio information. The first and second tracks are in synchronization and are read by an audio tape deck which is adjacent the tape. The first track of digital information is converted into a corresponding digital electronic signal, and simultaneously, the second track of audio information is converted into a discrete electronic audio output which forms part of a television signal. A video character generator converts the digital electronic signal into a discrete video signal which forms the video portion of the television signal. A frequency shift keying line amplifier is connected between the audio tape deck and the input of the video character generator for shifting the frequency of the digital electronic signal into a range which is compatible with the video character generator. A monitoring meter is connected between the frequency shift keying line amplifier and the input of the video character generator to allow monitoring of the range of the electronic signal. Other monitoring includes an audio monitor amplifier connected to the audio tape deck in combination with a monitor speaker and a video monitor connected to the video character generator. Color is imparted to the video character generator by means of a sync-color generator which is connected thereto for controlling the color of a corresponding video output of the discrete video signal. The audio and video portions of the television signal are applied to a cable television system program switching control. This is applied to a cable TV access channel monitor which is connected to the trunk line distribution of the cable TV system.

A process for making a magnetic audio tape for use with the above-described apparatus is also disclosed. The process is for captioning an audio signal message with a video message of character generator signals onto a magnetic audio tape having first and second channels. The audio message is recorded onto an audio recording medium and the video message is recorded onto a digital recording medium. The audio message is then transferred, after editing or other changes, from the audio recording medium to the first track of the magnetic audio tape. After transfer, the first track carrying the audio message is monitored and the video message is synchronously transferred from the digital recording medium to the second track of the magnetic audio tape. The result is that the video message carried by the second channel is in synchronization with the audio message carried by the first channel.

Also disclosed is a method of generating a television signal including a discrete electronic audio signal in synchronization with a discrete electronic video signal wherein digital information is recorded on a first track of magnetic tape and audio information is recorded on a second track of the magnetic tape in synchronization with the first track. The first track of digital information is read with an audio tape deck and converted into a corresponding digital electronic signal while the second track of audio information is simultaneously read by the tape deck and converted into the discrete electronic audio output. The digital electronic signal is converted into the discrete video signal by means of a video character generator.

BRIEF DESCRIPTION OF THE DRAWINGS

These features and objects of the invention, as well as others, will become apparent to those skilled in the art by referring to the enclosed FIGURE, which is a block diagram of the components of the invention.

DETAILED DESCRIPTION OF THE PREFERRED EMBODIMENT

The captioned radio communication concept reverses the delivery priority of television presentation in that the audio portion of the television signal is of relatively more importance than the video portion of the television signal. In effect, a television receiver employing a television signal from a captioned radio communication system performs as a radio with associated supportive printed data displayed on the video screen of the television. It is a radio service on television with printed words. The alpha-numeric screen printout supports and is in total synchronization with the audio at all times. The delivery system consists of an integrated hardware package employing available "off shelf" equipment and technology.

The basic program storage vehicle is multi-channel audio magnetic recording tape. The audio tape format supplies high capacity program storage in the order of five to twelve hours per program unit. In addition, the employment of audio tape allows for high speed duplication, giving a high copy depth of multiple programs at reasonable costs for field distribution.

The audio portion of the television signal is recorded in monaural form on two of the tracks of the multi-channel magnetic audio tape 1. One track is recorded in the forward mode and one track is recorded in the reverse mode. This bi-directional feature allows the program to form on a "closed loop" basis for the length of the program and repeats automatically at the end of the three to six hour presentation by employing a priority reverse at each end of the tracks. Of course, it is contemplated that the audio program may be recorded in stereo form for use in combination with television systems employing stereo audio signals.

Two additional tracks of the audio tape 1 are used to store the controlled data to drive the character generator. The character generator data signal is of a digital type and is audio in nature (frequency shift keying) and employs a frequency range of 1,200–2,200 Hz.

The field program equipment package consists of an audio tape playback mechanism 2 in combination with a video character generator 3. The audio tape deck 2 is of a professional caliber, employing standard quarter-inch tape width in a four-track interlaced bi-directional format. Full sized 14 inch reeling is used to provide the high capacity program storage. Normally, tape speed of 7.5 inches per second is used for the advantages of increased fidelity, better signal-to-noise ratio, reduced flutter and wow components, and reduced tape dropouts. However, it is contemplated that some program materials may merit the use of 3.75 inches per second tape speed to give optional increased program storage capacity.

The character generator 3 is a self-contained unit with local keyboard input in addition to the audio tape interface input. The Model D-2000 Television Character Generator produced and sold by DataVision Video Products, which is part of the Mincom Division of 3-M Company, is one such character generator. It holds four-page internal memories that can be controlled and refreshed from the audio tape program. The associated digital screen display information is composed and stored, using standard computer data entry techniques. This data is then recorded directly on one of the audio tracks of the master audio program tape through a digital-to-audio conversion interface unit. This assures perfect synchronization of the screen message with the audio program.

The page format of the character generator is ten rows of characters by twenty-four characters per row. Two character sizes are available: a large upper case, 28-scan, line-high character; and a smaller upper case, 20-scan, line-high character. The generator produces high-resolution, quality characters and a clean font design that results in a large, easy-to-read display.

Connected to the video character generator is a companion rack-mounted EIA sync and page colorizing generator 4 which drives the character generator and provides a choice of seven screen background colors for displaying with control logic stored on the audio tape. The colors of blue for normal operation and red for emergency notification use are preferred, as these colors provide good screen density for black and white TV sets as well as color sets.

A complete monitoring package compliments the captioned radio system. Preferably, a nine-inch black and white, high-resolution video monitor is connected to the video character generator and provides a visual display of the program video as well as editing display for the local keyboard data entry. Audio monitoring is supplied for checking program quality/cueing. Generally, an audio monitor amplifier 6 is connected to the audio tape deck and provides the input for a monitor speaker 7. Both the program audio channel and the frequency shift keying control data channel for driving the character generator may be monitored independently. For example, a signal meter 8 is available to read and aid in the correct output level settings of the frequency signal keying line amplifier 7 which is connected between the audio tape deck and the video character generator for shifting the frequency of the digital electronic signal from the audio tape deck into a range which is compatible with the video character generator.

It is contemplated that all captioned radio field units are housed in a self-contained, enclosed standard electronic equipment rack with the character generator mounted on a slide in/out shelf tray.

In the preferred embodiment, the audio output and video output are connected to a cable TV modulator which is part of cable TV system program switching control 9. The control 9 provides the captioned radio television signal to the cable TV access channel monitor 10 for distribution through trunk lines 11.

Other contemplated embodiments include the employment of the captioned radio system in combination with hotels and motels through a satellite feed. Alternatively, a multi-point distribution system employing nondirectional microwave may be coupled with the captioned radio system to provide transmission.

CAPTIONED RADIO PRODUCTION TECHNIQUES AND PROCEDURES

Once the program format is formulated (this is the style or purpose of the program—music, news, information, drama, education, etc.), the following development steps are implemented to create the Captioned Radio presentation:

1. Traffic Development

Building the Traffic Book of the program is the first required step. The Traffic Book is a combination of a program log and a "story board". It lays out minute-by-minute, page-by-page, the details of the program from start to finish for both the audio and video portions of the program. It is composed of bound paper formed sheets detailing:

(1) the video pages that hold the captioned material in a similar format to that of the screen display;
(2) timing notes of each video page;
(3) the page number assigned to each video page (usually in sequence as entered into the Data Entry storage);
(4) audio notations for aiding video data recording;
(5) audio program sequence notations.

The Traffic Book at the beginning holds the skeleton of the program formulation, and the notations are added to the sheets as each phase of the program (for audio and video) is completed.

A typical three-hour Captioned Radio Program Traffic Book is composed of about 90 formed sheets detailing events for about 360 video pages.

2. Audio Program Components

Depending again on the selected format of the program, the various required program components are selected. This may be music, interviews, spot announcements (commercial or noncommercial), promotional announcements, news items, etc. This is developed from sources supplied by the program department and related information from the marketing department, if material is commercial or sold to a client.

The program components are in the form of scripts, tape recordings and records. Notation of order of sequence, timing, selections of "cuts" or "takes" are noted in the Traffic Book.

In the case of program interviews (as in the program use of Am-Net), the recordings of the interviews are carefully edited to eliminate unwanted remarks, bloops or coughs as well as a general "tightening" of presentation and timing.

3. Audio Program Master Recording

Using the Traffic Book as a guide, and the assembled program components, a master audio recording of the program is made on a multi-track audio tape recorder. The head track format of this recorder corresponds with head tracking of the field Captioned Radio terminals; that is, two-track stereo mode for bidirectional playback. Generally, 4-channel, in-line, quarter-inch stereo tape recorders are used for the mastering process. With this equipment, all tracks or channels may be monitored at any time to aid in checking of the mastering mode.

Of the four tracks recorded on the tape, Track 1 and Track 4 are used for the audio program content. Tracks 2 and 3 are dedicated for the recording of the digital data information or the FSK tones. These two tracks are aligned close to the center of the width of the tape, insuring greater accuracy of reproduction (because of less tape edge damage), required for the steady tone of the FSK.

Therefore, the audio program is mastered, starting at the head of Track 1, on through the reel to the end of the reel of tape (or tail) in the forward direction. Then the tape reels are manually reversed on the recorder and the program master recording continues on Track 4 on the reverse direction until the "head" of the tape is again reached. This creates the bidirectional qualities of the program, or the closed loop feature of the program. The closed loop time length (program start to finish) is generally three to six hours (program storage time) depending on the length of the tape and/or the drive speed of the tape. In most cases, one-mil, 3,600-ft. audio tape loaded on a 10½-inch reel is used, running at a speed of 7.5 ips (three hours) or 3.75 ips (six hours).

Since the program repeats many times in the field and it is built on a closed loop basis, the program is designed not to have an opening or a close; it appears just to continue on.

New, high performance tape is always used for the master recording. This insures a stable and reliable recording. The master recording process must not tolerate splices or worn tape showing edge damage or track wear. Any unstable conditions of this tape will create problems in the duplication of field program copies that may produce errors during the final playback on the field Captioned Radio terminals.

The audio program is mastered in sections with some degree of electronic editing employed. If a section is not proper because of poor timing or cueing mistakes, it may be re-recorded for the proper results. Automatic audio volume amplifiers and limiters are used in the audio chain, as well as an audio frequency shaper to adjust the final audio signal to best match and modulate the television modulator in the field. Extreme care is taken throughout the entire process to maintain the highest professional standards for audio reproduction.

4. Captioning

The process of captioning is the preliminary conversion of the audio message to a printed screen display. This conversion may be partial or complete; that is, only a few lines representing a visual thought of the audio message or a complete screen page, fully printed and following the entire audio thought. Generally, a combination of both partial and complete forms of captioning are used in a Captioned Radio presentation.

Developing a complete form of captioning, as in the case of showing an interview on the screen (as used in an Am-Net program), several steps must be followed. An audio cassette copy of the original taped interview is first recorded. The cassette is then played back on a stenographer's dictation unit, using a foot start/stop pedal and an automatic back-spacing or repeating feature. A typist with editorial skills listens to the recorded contents and translates the recorded message onto a typed replica of the message as it would appear on the TV screen. These pages are typed on the formed sheets used in the Traffic Book. The pages are formatted to the size of the typewriter type style and represent, by proportional relationship, the size and format of the character generated data shown on the screen (i.e., 10 lines by 24 characters).

The captioned pages are typed in sequence on the formed sheets and consist of about 240 characters for each video page.

Two factors must be realized and adjusted using this method:
(1) The human voice speaks at a rate of about 120 words per minute;
(2) the inherent timing interval of the captioned radio terminal from page-to-page display is a minimum of 240 characters every 20 seconds.

Therefore, the audio message will contain more information than can be displayed by screen conversion. This factor requires an editorial judgment by the caption person to condense and partially re-write the audio message content to fit the format and timing interval of the screen display.

Because of the minimum 20-second timing interval of page-to-page display, a timing record of each captioned page is made by a stopwatch and noted on the sheet in relation to the audio message content. These page display timings range from 20 to 45 seconds, depending on the audio message content. Actual average display timings of 30 seconds are desired. A display time of 45 seconds or more indicates a greater loss of captioned information and tends to make the screen display static or dull. On the other hand, too short a screen display will impair readership of the message.

An average eight-minute audio interview displays from 16 to 18 captioned pages requiring about 45 minutes of production time per interview by a skilled caption person.

A basic purpose and benefit of a complete captioned display presentation is to aid and provide information for the deaf and hearing impaired.

5. Data Entry Processing

Data entry is the conversion process of the typewritten visual script to digital display for television viewing. In addition, data entry provides massive page storage in sequential order for use during the video data recording stage.

Data entry is performed at a character generator terminal equipped with a digital tape cassette record/playback unit and video display monitor. The digital cassette tape unit stores and reads up to 300 pages per cassette of indexed screen displays, matching the screen format of the field captioned radio terminals.

Each captioned page of the program is typed on the keyboard of the character generator and then is stored, in number sequence, on the digital tape cassette. All program captioning is referenced from the traffic book. Each recorded data page is assigned a sequential index number (1-2-3, etc.) and noted next to the like-captioned page in the Traffic Book. The digital cassette unit has a numbered keypad call-up feature that allows the retrieval of random or sequential page displays. This aids in addressing any page for edit corrections or copy changes. In addition, some pages may be reserved on the cassette to store and pull back frequently used format pages; i.e., visual identifications, visual promotions and repeated copy pages for use in the program—without individually reconstructing these entries.

The art of correct data entry lies in two operator skill areas:
(1) the speed of keyboard typing of captioned pages into the data terminal (must be high and correct in order to produce the volume of page storage of a captioned radio presentation in a reasonable amount of time—a three-hour program consumes up to 360 video pages, a six-hour program may consume about 720 video pages);
(2) the proper graphic design layout of each display page must be created at the time of data entry to provide a pleasing, artistic and effective screen display required for responsive viewership.

Some of these graphic features include:
(1) centering of individual lines of words;
(2) left- and right-hand justification of paragraphed copy;
(3) proper use of the two styles of character height font available from the generator;
(4) the use of display enhancements; i.e., stars, crosses, boxes, underlining, and character or word flashing modes.

The data entry processing requires the operator to have editorial judgment and correct spelling skills. Even though the original first phase captioned script was developed for the proper screen display format, the data entry operator must always adjust each page to fit the final layout of the display to meet the desired graphic requirements.

The digital tape cassette stores up to 300 individual data pages per cartridge. To meet the additional page requirement of a three- or six-hour program, two cassettes are used to store all of the recorded data pages. One cassette stores all data pages for Track A (first half) of the program, the second cassette stores data for Track B (second half) of the program. The cassettes are changed at a convenient time when the master audio tape is manually reversed during the video data recording process.

The average production time for a skilled data entry operator to create the stored data for a three-hour program (with content containing a large volume of completed captioning) is 18 to 20 hours per program.

Upon completion of data entry production, the captioned radio presentation is now ready for a final quality review before mastering the video data recording process. This review brings together for the first time the entire presentation, both the audio portion and the visual display, on a real time basis. The master audio program tape is manually monitored while the stored sequential data pages are manually retrieved and displayed. The total synchronized program is checked for visual errors. Any discrepancies in spelling, timing or page sequence, and visual meaning may be corrected at this point. The monitoring process may be stopped at any time and the new data corrections are entered into the data cassette, replacing the faulty pages. This "proofing" is performed by a third person, skilled in proofreading, who was not involved in the original pre-production of the program. The time required for this monitoring step is about 4-5 hours for a 3-hour program.

6. Video Data Recording Process

The next step is the recording of the stored video display data pages onto the master program audio tape. The four-channel master tape recorder is coupled to the data entry terminal and records the signal of the converted digital display information fed from the cassette storage unit and the character generator.

This input signal is the two audio frequency tones, or the frequency shift keying (FSK) tones operating at 1,200 and 2,200 Hz. The FSK/digital conversion transmitter is contained in the character generator.

The data entry terminal has a video monitor for page display viewing and an audio monitor for listening to the program content and the transmitted FSK tones.

The master program tape is placed on the tape recorder starting at the beginning of the program on Track A, monitored on channel one. The data tones are recorded on channel three in the forward direction mode. The professional tape recorder has a "sel-sync" feature that allows the operator to monitor the audio program on channel one from the in-line recording head stack, while at the same time recording the data tones on channel three. This insures the accurate and instant synchronizing timing factor required for the audio and video page display presentation.

The stored video data pages are retrieved from the digital cassette unit in sequential order. Each page is "loaded" by command into page one of the internal page memory of the character generator. This loading procedure requires a minimum time of 10 seconds. The streaming display is viewed on the monitor. When the page is loaded, the video data may be transmitted, upon command, from the generator to the tape recorder via the FSK tones. This transmission time requires an additional 10 seconds. The transmission of the FSK tones are heard on the audio monitor.

Since the data tone signal cannot tolerate a rapid break in level, the recording process requires a fade-up and fade-down at the beginning and end of each of the program tracks. Normal recording level of the steady tone is recorded at zero VU or 100% setting during the recording.

In the event an error is made during the data recording (usually due to a timing problem) a "re-take" recording may be made. This must be done at sections of the master tape exhibiting the local insert pages in the program. The "soft record erasure" feature in the tape recorder allows this action without producing tone break errors of display.

Again, the Traffic Book provides all program notations to give aid in completing a successful video data recording session. This recording period requires intense attention to details by the operator and needs a "closed door", no-interference time frame of three to four hours of production for a three-hour program presentation.

7. Final Program Monitor Check

Once the completed captioned radio program tape is mastered, the entire program is reviewed on a captioned radio terminal for any technical signal errors, before being duplicated.

Technical errors may result from:
(1) unknown tape drop-outs and edge damage;
(2) timing problems;
(3) defective page transmissions.

If any errors are detected, a portion of the video data recording may have to be re-recorded to produce a perfect master. This reviewing process requires a minimum of three hours for a three-hour presentation.

8. Program Tape Duplication

Duplication of the captioned radio program is the final phase of the production development. The master program tape is duplicated on a series of four-channel tape recorders, recording all four signal tracks at one time. This process may be accomplished at 1 to 1, or 2 to 1 speeds; or by high speed duplication (8 to 12 times speed), depending on the required copy depth and cost efficiency.

Tapes may be duplicated "tails forward" to give a smooth even tape wind on the reel. Program tapes should never be shipped with a poor or loose wind (this causes tape edge damage).

The monitoring of all four channel recording meters for proper levels are read on the playback made during duplication.

The selection of quality checked recording tape stock must be made prior to duplication. Returned stock from the field must be inspected for defects and proper lengths. Generally, duplication tape may be used twice in the field before discarding for use on captioned radio. Metal 10½ inch NAB hub reels are used for the tapes. All duplicated tapes are shipped in metal film cans to protect the magnetic integrity of the duplicated programs.

Random samples of the duplicated programs are spot monitored on a captioned radio terminal for quality control. Production time for duplication and monitoring varies according to the field copy depth and the mode of duplication.

Video tape versions of the captioned radio program may be duplicated, on a one-to-one basis, with a captioned radio terminal providing signal feed to a bank of video tape recorders. The video tape format extends the coverage of the captioned radio presentation to existing video tape playback networks.

The Captioned Radio Program, as viewed on a television set, appears to be a simple presentation. The concept employs only the audio medium and the typed word. But after reviewing these production techniques used to develop a program of sufficient duration, it is obvious that many hours of planning, preparation and execution of production efforts are mandatory to produce a single program. Only through a reasonably large distribution network, requiring a number of duplicated program copies, may true cost efficiencies be realized. However, when compared against the production costs of regular video/television presentations, the Captioned Radio format excells in cost value in relationship to viewer response.

In another contemplated embodiment, a digital cassette player and recorder may be interconnected with the character generator. The video portion of the broadcast is stored on a sequential page-by-page basis on a cassette (buffer memory such as a computer disc or solid state memory) located in the player and recorder. The system is indexed so that any pre-stored page may be called up and input through the character generator for video display. In such an embodiment, the track of the tape normally carrying the video portion carries signals to call up the indexed pages.

Various changes may be made in the details of the invention, as disclosed, without sacrificing the advantages thereof or departing from the scope of the appended claims. Furthermore, although the present invention has been disclosed and discussed with particular regard to its exceptional advantages in terms of cable TV systems, it may be understood that the invention may be employed in several industrial applications wherein synchronized primary audio signals may be transmitted through a television system in combination with character readouts on the video.

What is claimed is:

1. An apparatus for generating a television signal including a discrete electronic audio signal in synchronization with a discrete electronic video signal comprising:
   (a) a magnetic audio tape having a first track of digital information and a second track of audio information, said first track in synchronization with said second track;
   (b) an audio tape deck means adjacent said tape for reading the first track of digital information and converting the digital information into a corresponding digital electronic signal and for simultaneously reading the second track of audio information and converting the audio information into the discrete electronic audio output; and
   (c) a video character generation means having an input for receiving the digital electronic signal, said video character generation means converting said digital electronic signal into the discrete video signal, said discrete electronic audio output comprising sounds from a human voice and said discrete video signal comprising a visualization in character form of said human voice sounds.

2. The apparatus of claim 1, wherein a frequency shift keying line amplifier means is connected between said audio tape deck means and the input of said video character generation means for amplifying the frequency of the digital electronic signal into a range which is compatible with said video character generation means.

3. The apparatus of claim 2, wherein a monitoring meter is connected between said frequency shift keying line amplifier means and the input of said video character generation means.

4. The apparatus of claims 1 or 2, wherein a first monitoring means is connected to said audio tape deck for monitoring the discrete electronic audio signal and a second monitoring means is connected to the video character generator for monitoring the discrete electronic video signal.

5. An apparatus for generating a television signal including a discrete electronic audio signal in synchronization with a discrete electronic video signal from a magnetic audio tape having a first track of digital information in synchronization with a second track of audio information, said apparatus comprising:
   (a) an audio tape deck means for reading the first track of digital information of the tape and converting the digital information into a corresponding digital electronic signal and for simultaneously reading the second track of audio information of the tape and converting the audio information into the discrete electronic audio output; and
   (b) a video character generation means having an input for receiving the digital electronic signal, said video character generation means converting said digital electronic signal into the discrete video signal, said discrete electronic audio output comprising sounds from a human voice and said discrete video signal comprising a visualization in character form of said human voice sounds.

6. A method of generating a television signal including a discrete electronic audio signal in synchronization with a discrete electronic video signal comprising:
   (a) providing a magnetic tape having a first track and a second track;
   (b) recording digital information on the first track of the magnetic tape;
   (c) recording audio information on the second track of the magnetic tape in synchronization with the first track;
   (d) reading the first track of digital information with a first audio tape deck means adjacent the tape and converting the digitial information into a corresponding digital electronic signal;
   (e) simultaneously reading the second track of audio information with a second audio tape deck means adjacent the tape and converting the audio information into the discrete electronic audio output; and
   (f) converting the digital electronic signal by means of a video character generator into the discrete video signal, said discrete electronic audio output comprising sounds from a human voice and said discrete video signal comprising a visualization in character form of said human voice sounds.

7. A process of captioning an audio message with a video message of character generator signals onto a magnetic audio tape having first and second channels, said process comprising the steps of:
   (a) recording the audio message on an audio recording medium;
   (b) recording the video message on a digital recording medium;
   (c) transferring the audio message from the audio recording medium to the first track of the magnetic audio tape;
   (d) monitoring the audio message on the first track of the magnetic audio tape; and
   (e) synchronously transferring the video message from the digital recording medium to the second track of the audio magnetic tape whereby the video message is in synchronization with the audio message, said audio message comprising sounds from a human voice and said video message comprising a visualization in character form of said human voice sounds.

8. An apparatus for generating a television signal including a discrete electronic audio signal in synchronization with a discrete electronic video signal comprising:
   (a) a magnetic audio tape having a first track of digital information and a second track of audio information, said first track in synchronization with said second track;
   (b) an audio tape deck means adjacent said tape for reading the first track of digital information and converting the digital information into a corresponding digital electronic signal and for simultaneously reading the second track of audio information and converting the audio information into the discrete electronic audio output;
   (c) a video character generation means having an input for receiving the digital electronic signal, said video character generation means converting said digital electronic signal into the discrete video signal; and
   (d) a sync-color generator connected to said video character generator means for controlling the color of a corresponding video output of the discrete video signal.

9. The apparatus of claim 8, wherein a first monitoring means is connected to said audio tape deck for monitoring the discrete electronic audio signal and a second monitoring means is connected to the video character generator for monitoring the discrete electronic video signal.

* * * * *